Patented Sept. 26, 1939

2,174,501

UNITED STATES PATENT OFFICE 2,174,501

SODIUM SALT OF LITHOL RED AS A DRY TONER

Henry H. Reich, Somerville, N. J., assignor to The Calco Chemical Company, Inc., Bound Brook, N. J., a corporation of Delaware No Drawing. Application July 21, 1937, Serial No. 154,753

1 Claim. (Cl. 260—195)

This invention relates to a novel method of producing Lithol red, and to a new and improved product.

Lithol red is usually the calcium salt of the azo dye produced by diazotizing Tobias acid (2 naphthylamine 1 sulfonic acid) and coupling on betanaphthol. The color is used to a large extent in printing inks, coated paper, wall paper, paints, and the like. Modified Lithol reds have been proposed in which part of the Tobias acid is substituted by 2 chlor 5 aminotoluene 4 sulfonic acid. This product is a yellower red and has a somewhat brighter shade but is still not as bright and strong as desired, and it has hitherto been impossible to produce a product having the desired shade and brightness.

According to the present invention, it has been found that if the sodium salt instead of the calcium salt is made with a very definite proportion of chloraminotoluene sulfonic acid (5–10% on the weight of Tobias acid) a much brighter and stronger product is obtained which gives a better shade and which, by reason of its greater strength, requires a smaller amount of color to obtain a given coverage. It is not known just what is the chemical nature of the difference in shade obtained and the present invention is not limited to any particular theory of action but it should be noted that the same strength and brightness is not obtained when the critical percentage of chloraminotoluene sulfonic acid is used in producing the calcium salt. It is therefore my belief that the critical percentage of chloraminotoluene sulfonic acid produces a somewhat different physical or chemical constitution in the sodium salt than is produced in the calcium salt with the same amount of chloraminotoluene sulfonic acid or in the sodium salt which has been produced previously by a different process and different proportions of ingredients. The invention will be described in detail in a typical example, but it is not limited to the exact reaction conditions described so long as the percentage of chloraminotoluene sulfonic acid remains within the critical range.

Example 85 kgs. of Tobias acid and 5 kgs. of 2 chlor 5 aminotoluene 4 sulfonic acid are dissolved in a mixture of 500 liters of water containing 17 kgs. of caustic soda, the temperature being 80° C. The mixture is then cooled down with ice to 2° C. and 29 kgs. of sodium nitrite in 290 liters of water added at 5° C. 12 lbs. of 20° hydrochloric acid in 1000 liters of water is rapidly added at 5° C. with vigorous stirring, continuing for about one minute after the addition is complete. The solution is then permitted to stand for fifteen minutes and the diazo compound produced washed three times with ice water. This is followed by filtration reslurrying and the slurry is cooled with ice to 5° C.

60 kgs. of betanaphthol are dissolved in 500 liters of water at 90° C., the solution containing 24 kgs. of caustic soda and 1 kg. of soda ash. 2500 liters of cold water and ice is added to bring the temperature of the solution down to 10° C. whereupon the diazo solution is added to the betanaphthol solution and stirred for three hours. After stirring the reaction mixture is allowed to stand all night then brought to a boil and boiling continued for two minutes, followed by hot filtration and drying at 60° C. An extremely bright and strong Lithol red is produced which is both stronger and brighter than the standard Lithol red produced in the form of calcium salt.

I claim:

A sodium salt of Lithol red produced by coupling a diazotized mixture of Tobias acid and 2 chlor 5 aminotoluene 4 sulfonic acid on betanaphthol, the proportion of the chloraminotoluene sulfonic acid being from 5 to 10% of the Tobias acid.

HENRY H. REICH.